O. W. SEELY.
Kettle for Manufacturing Salt.
No. 32,005.
Patented April 9, 1861.
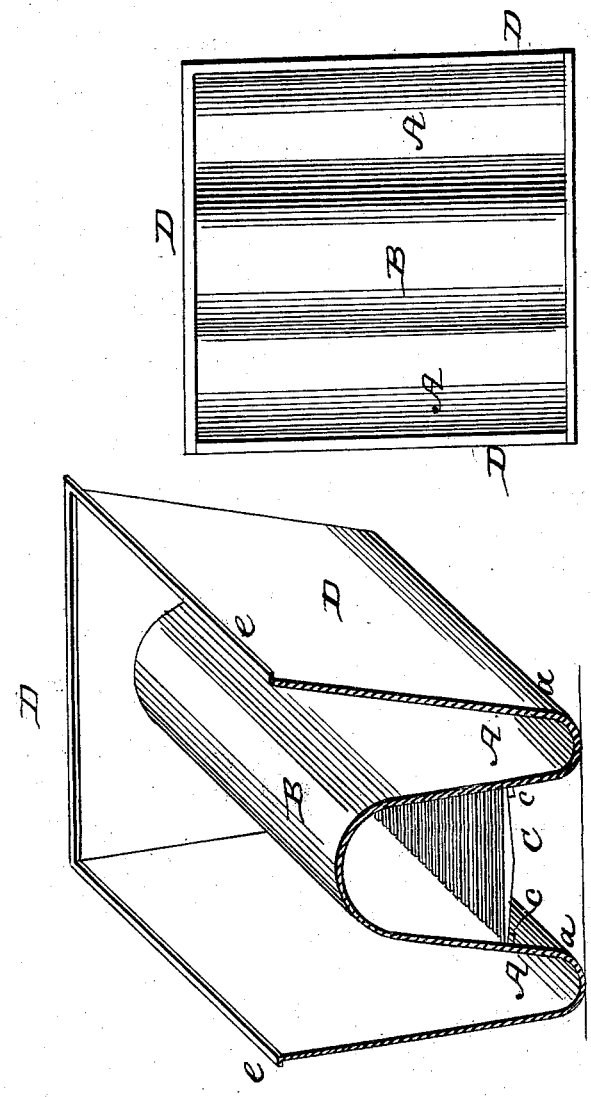

United States Patent Office.

O. W. SEELY, OF ALBANY, NEW YORK.

IMPROVEMENT IN CONSTRUCTION OF SALT-KETTLES.

Specification forming part of Letters Patent No. 32,005, dated April 9, 1861.

*To all whom it may concern:*

Be it known that I, O. W. SEELY, of Albany, in the county of Albany and State of New York, have invented a new and Improved Construction of Kettles for the Manufacture of Salt; and I do hereby declare that the following is a full and exact description thereof, reference being had to the accompanying drawings and references, which form a part of this specification.

The nature of the invention consists in so constructing the kettle that the greatest heat shall be concentrated upon the middle and upper part or strata of the liquid to be treated; secondly, that the salt, as fast as it crystallizes, shall descend to the part of the kettle which is below the fire; and, thirdly, that the heat of the fire, by being concentrated on the inner faces, $a\ a$, of the kettle, shall be most favorable for keeping up a rapid circulation in the boiling liquid, as hereinafter set forth.

Figure 1 in the drawings represents an end view in perspective; Fig. 2, a top view.

Similar figures and letters represent the same parts in all the figures.

A A represent the well or descending parts of the boiler, at the bottom of which are received the crystallized salt.

B represents the arch over the fire; G, the fire-grates, and $c\ c$ the flanges on which the fire-grates rest.

D represents the external faces or sides of the kettle $a\ a$, the internal faces or sides of the kettle toward the fire. $b\ b$ is the well-bottom.

C is the belly of the grate.

To enable others skilled in the arts to make and use my invention, I will proceed to describe it.

Most of the boilers constructed for making salt form and retain the crystals near the hottest part of the boiler, and thus burn, or at least injure, the product, which attaches itself very firmly to the sides or bottom of the vessel, and forming a crust which prevents the contact of the boiling liquid with the metal. The result of such action is that there forms between the metal and the water a layer of salt, acting as a non-conductor of heat, by which means the metal on the one side becomes unequally and unduly heated, while a less amount of heat is conducted through the layer of salt to the boiling water, and a less amount of evaporation takes place than would otherwise occur. In the present invention the fire is placed in the central part of the kettle, above the grate G. The mass of water is retained between the sides D D and $a\ a$, and extends upward above the arch B. The lower portion, $b\ b$, into which the crystalline grains fall and remain till removed by means of a scoop or equivalent, is below the fire, and therefore out of the range of the heat. It is accumulated without compacting into a dense mass, and is easily removed.

The boiler being constructed of iron in the usual manner of constructing boilers, and of the form shown in the drawings, the brine being prepared for the work is filled into the boiler so as to cover the arch to a certain extent—best learned by practice. Fire is made on grate G, and the brine brought to to the boiling-heat. The first effect of the heat upon the liquid is that the liquid in contact with the sides $a\ a$ and arch B will be expanded, and will rise upward, and thus tend to make the liquid higher in the middle than it is on the outer sides of the vessel, and a current will be formed toward the outside and thence downward along the outsides to the well, and from the well upward along sides $a\ a$. Thus the ascending currents will be along the inner sides, and the descending currents along the outsides, of the boiler, and the circulation will be in proportion to the amount of heat generated, and the salt will be constantly deposited in the well or wells of the boiler at $b$. The fire is easily kept up, and the boiling made continuous for any length of time.

This mode of treating the brine in the present form of boiler has a great advantage over the ordinary method of working, as the boilers now in use require the stopping of the work every week, or oftener, to scrape off the burned crust of salt.

Having now described the nature of the invention and the method of applying and using the same, what I claim as my invention, and desire to secure by Letters Patent, is—

The combination of the central arch, B, containing the fire-grate, with the two inverted arches at $b\ b$, to form the [bottom part of the boiler in the shape herein represented and described, and for the purpose set forth.

O. W. SEELY.

Witnesses:
WM. H. HOPE,
J. A. GAUBERSCHMIDT.